United States Patent [19]
Sedath et al.

[11] Patent Number: 5,151,183
[45] Date of Patent: Sep. 29, 1992

[54] REDUCTION OF MEMBRANE FOULING BY SURFACE FLUORINATION

[75] Inventors: Robert H. Sedath, Bensenville, Ill.; Donald R. Taylor, Randolph, N.J.; Lloyd S. White, Columbia, Md.

[73] Assignee: Allied-Signal Inc., Morris Township, Morris County, N.J.

[21] Appl. No.: 749,097

[22] Filed: Aug. 23, 1991

Related U.S. Application Data

[63] Continuation-in-part of Ser. No. 353,575, May 18, 1989.

[51] Int. Cl.$^5$ .............................................. B01D 71/68
[52] U.S. Cl. .................... 210/500.41; 210/639
[58] Field of Search ............... 58/158, 16; 210/639, 210/500.41

[56] References Cited

U.S. PATENT DOCUMENTS 4,828,585  5/1989  Chiano ........................... 55/158

*Primary Examiner*—Frank Sever
*Attorney, Agent, or Firm*—Mary Jo Boldingh; Harold N. Wells; Gerard P. Rooney

[57] ABSTRACT

The instant invention is a membrane useful for separating organic matter such as proteins from aqueous solutions which resists fouling and maintains a high flux during separation. The membrane is prepared by either drying a polysulfone composite membrane, or first treating a polysulfone composite membrane with aqueous methanol and then drying it. The membrane is then exposed to elemental fluorine in an inert gas in the substantial absence of oxygen at a temperature in the range of about −45° to 70° C. After fluorine treatment, the membrane is exposed to air. The fluorine content in the treatment mixture may be from 0.0125 to about 10 volume percent, preferably 0.025 to 2 volume percent. The fluorine treatment does not significantly alter the membrane pore size.

9 Claims, 5 Drawing Sheets

REDUCTION OF MEMBRANE FOULING BY SURFACE FLUORINATION

CROSS-REFERENCE TO RELATED APPLICATIONS

This application is a continuation-in-part of our prior application Ser. No. 07/353,575, filed May 18, 1989.

BACKGROUND OF THE INVENTION

Field of the Invention

The separation of organic matter from aqueous solutions in industry is usually accomplished by energy intensive processes such as evaporation and distillation. Using a membrane to effect the separation would be more economical and energy efficient, but fouling of the membrane with organic matter often occurs, reducing the flux through the membrane to the point where membrane separation is no longer economically feasible. It is highly desirable to develop a membrane which can maintain a high flux and which is foulant resistant.

Description of the Related Art

The use of membranes to separate organic matter from aqueous solutions is known and treatment of these membranes to reduce fouling and to increase flux has been previously reported. The use of nonionic surfactants adsorbed onto ultrafiltration membranes to increase the initial flux, reduce the decline of the flux, and decrease the rate of protein deposition was reported in Fane et al., "The Effect of Surfactant Pretreatment on the Ultrafiltration of Proteins," *Desalination.* 53, 37-55 (1985). Models of protein deposition and strategies for control of fouling are suggested by Fane et al., "A Review of Fouling and Fouling Control in Ultrafiltration," *Desalination.* 62, 117-136 (1987). These strategies included the use of surfactants or polymers to increase the homogeneity and hydrophilicity of the surface.

The instant invention concerns the treatment of a polymer membrane with fluorine in the substantial absence of oxygen. Fluorine treatment of the surfaces of various polymers is known. Dixon et al., in U.S. Pat. No. 4,020,223, disclose treatment of polyolefin and polyacrylonitrile fibers with fluorine in the presence of small amounts of oxygen to increase the amount of fluorination. The patentees state that improved water absorption results from the treatment. The purpose of the treatment was related to improvement in the performance of fabrics made from such treated fibers.

Fluorination of various polymers, particularly hydrocarbon polymers, in the absence of oxygen but using a cold plasma was disclosed by Anand et al. in U.S. Pat. No. 4,264,750.

Functionalized polymers containing pendant ester, carboxylic acid, acid halide, or acid anhydride groups were fluorinated by fluorine-inert gas mixtures by Lagow as shown in U.S. Pat. No. 4,076,916.

Boultinghouse, in U.S. Pat. No. 4,296,151, discloses the fluorination of plastic articles with fluorine in an inert gas to make the surfaces more water wettable and receptive to various coatings, inks, paints, etc. The plastics were formed from hydrocarbons such as olefins, dienes, and vinyl-substituted aromatics.

McGinniss et al., U.S. Pat. No. 4,491,653, examined the surface-fluorination of polymeric solids and determined that the oxygen content should be restricted and that partial fluorination of the surface to produce -CHF- groups was desirable. Various types of polymers were suggested as being benefitted by such fluorination, including polysulfone, although no working example was provided.

Chiao et al., U.S. Pat. No. 4,828,585, discloses the treatment of a gas separation membrane with fluorine in an inert gas. Although the selectivity of the membrane is increased due to the fluorination treatment, gas permeability, i.e., gas flux, is apparently slightly decreased.

Fluorine treatment of a polymer membrane which resulted in a reduction in fouling was reported by one of the inventors of the instant application in Sedath et al., "Reduction of Fouling in Ultrafiltration Membranes via Surface Fluorination," *Proc. Intl. Conor. Membranes and Membrane Processes* (1990).

SUMMARY OF THE INVENTION

The membrane of the instant invention separates organic matter such as proteins from aqueous solutions and resists fouling and maintains a high flux during separation. The membrane is prepared by either drying a polysulfone composite membrane, or first treating a polysulfone composite membrane with aqueous methanol and then drying it. The membrane is then exposed to elemental fluorine in an inert gas in the substantial absence of oxygen at a temperature in the range of about $-45°$ to $70°$ C. After fluorine treatment, the membrane is exposed to air. The fluorine content in the treatment mixture may be from 0.0125 to about 10 volume percent, preferably 0.025 to 2 volume percent. The fluorine treatment does not significantly alter the membrane pore size.

DETAILED DESCRIPTION OF THE INVENTION

Figure 1:
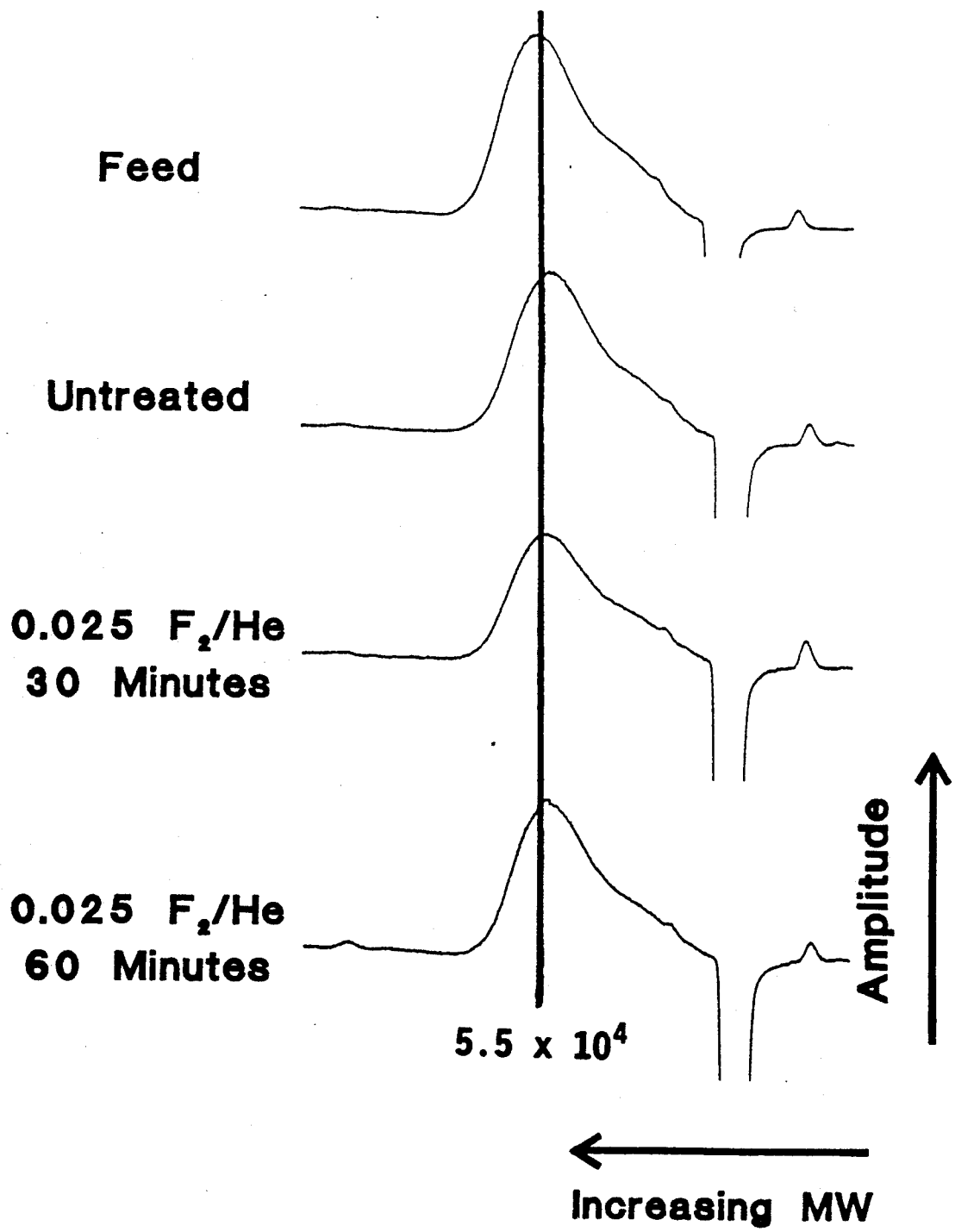
FIG. 1 shows the effect of fluorine treatment on the ability of a membrane to separate a low molecular weight distribution of dextran from an aqueous solution.

This invention is a membrane useful for separating organic matter from aqueous solutions. Membranes may be used to physically separate solutes with molecular sizes of approximately 0.0003 to 0.001 $\mu$m (reverse osmosis), 0.001 to 0.05 $\mu$m (ultrafiltration), and 0.05 to 5 $\mu$m (microfiltration). The membrane of the instant invention may be used for ultrafiltration and microfiltration. Of particular interest is the separation of macromolecules such as starch and protein from solution. These macromolecules fall within the ultrafiltration molecular size range.

The membrane of the instant invention is prepared using a composite membrane which is a thin asymmetric porous polysulfone membrane made by depositing a polysulfone as a viscous solution on a porous backing. The membrane is either dried in air or first treated with an aqueous methanol solution and then dried in air. The polysulfone side of the composite membrane is then treated by exposing it to elemental fluorine in an inert gas in the substantial absence of oxygen. The treated membrane is subsequently exposed to air. The treated membrane exhibits improved water flux as well as improved flux during the separation of organic solids from aqueous solutions. The treated membrane also has a higher resistance to fouling. These benefits result from the fluorination of the surface of the membrane, a treatment which does not penetrate far under the surface and which does not significantly alter bulk properties of the membrane, e.g., the pore size. Membranes with pore diameters ranging from 0.001 to 10 μm may be treated.

The fluorine content in the treatment mixture is from about 0.0125 to about 10 volume percent, preferably 0.025 to 2 volume percent, and the reaction is carried out at a temperature of from about $-45°$ C. to $+70°$ C., with ambient temperature generally preferred. Examples of inert gases which may be used are gases which do not interact with fluorine or with the polysulfone membrane, e.g., helium, nitrogen, and argon. The pressure will generally be atmospheric or sub-atmospheric, but above-atmospheric pressures may also be used. The reaction may be initiated by ultraviolet radiation, but its use is not considered essential. Exposure times will range from 5 minutes to 2 hours.

The fluorine treatment is independent of the membrane configuration. It may be carried out either batchwise or in a continuous manner, depending upon the type and amount of membrane being treated.

The preferred embodiment membrane is prepared by treating a composite membrane comprising polysulfone, a high molecular weight polymer containing sulfone groups and aromatic nuclei in the main chain. The preferred polysulfone is the condensation product of bisphenol A and dichlorodiphenyl sulfone which has considerable resistance to temperature and hydrolysis. Other polysulfones which may be used are polyphenyl sulfones, polyether sulfones, polyaryl ether sulfones. When polysulfones are used to make ultrafiltration, or microfiltration membranes, they are either melt extruded in the presence of pore forming materials or solution cast onto the membrane backing and then precipitated in a non-solvent. When used in ultrafiltration, composite polysulfone membranes must be pretreated in some manner to be useful since an untreated dry polysulfone membrane will pass only a very small amount of water even when substantial pressure is applied. Pretreatment with aqueous methanol or surfactants before membrane use is a common temporary solution to this problem. However, the inventive membranes do not need any pretreatment to obtain a high initial flux. Furthermore, the polysulfone membranes foul when used to separate organic materials such as potato waste from aqueous solutions while the inventive membranes are foulant resistant.

EXAMPLE 1—STANDARD MEMBRANE FLUX

Polysulfone ultrafiltration membranes made by Allied-Signal Inc., Fluid Systems Division were tested for water flux. These membranes are composed of a type of polysulfone which is the condensation product of bisphenol A and dichlorodiphenyl sulfone. They are thin asymmetric membranes which are made by depositing polysulfone as a viscous solution on a porous nonwoven polyester backing and which have a nominal pore size of 0.01 μm measured by scanning electron microscopy. The thickness of the backing is approximately 102–127 μm (4–5 mils) and the thickness of the entire composite (backing and polysulfone coating) is approximately 191–216 μm (7.5–8.5 mils).

A sample of the membrane measuring 25.4 mm × 76.2 mm was dried in air in a fume hood overnight at room temperature. The sample was then placed in a closed loop system which for testing purposes recirculates both the fluid which passes through the membrane (permeate) and the fluid which does not pass through the membrane (retentate). The filtration system was run in a crossflow configuration. Very little water (only about 61.1 L/m$^2$/day) passed through the dry membrane even when the pressure differential across the membrane was 689.5 kPa. However, when a sample of the same type of membrane was pretreated by immersion in a 50% aqueous methanol solution and then dried in air, a water flux of about 4074 L/m$^2$/day with a differential pressure of 689.5 kPa was obtained.

EXAMPLE 2—FLUORINE TREATMENT AND FLUX MEASUREMENT

A polysulfone ultrafiltration membrane of the type used in Example 1 was dried in air in a fume hood overnight at room temperature and exposed to a flowing mixture of elemental fluorine in helium. The membrane sample was supported on a Monel sheet mounted in a 101.6 mm o.d. Monel cylinder 152.4 mm long. A predetermined mixture of helium and 0.05 vol % fluorine was passed through the Monel cylinder continuously. The fluorine used was 97% technical grade material supplied by Air Products and Chemicals Inc. The helium gas was 99.9% pure and was scrubbed of any trace oxygen by Oxisorb cartridges supplied by Matheson Gas Products. The conditions of fluorine treatment were about 20° C. and 101.3 kPa.

After fluorine treatment, the sample was exposed to air with a relative humidity of about 70 to 80% at room temperature and was then tested in the equipment of Example 1 and a water flux of 3300 L/m$^2$/day was obtained at a pressure differential of 689.5 kPa. The increase in water flux was comparable to that obtained with a membrane subjected to the aqueous methanol pretreatment described in Example 1. Unlike the fluorine treatment, however, the aqueous methanol treatment is temporary. The fluorine treatment, however, is considered durable while the methanol would be expected to be removed in use so that should the membrane be dried, it would lose much of its ability to pass water and require re-conditioning with methanol.

EXAMPLE 3—TREATMENT OF INVENTIVE MEMBRANES

A series of polysulfone membranes of the type described in Example 1 were treated with fluorine using the procedure described in Example 2, except that nitrogen was used as the inert gas and the fluorine concentrations and exposure times were varied. The samples measured 203 by 254 mm. Table I lists the treatment of the samples.

The inventive samples are labeled Samples A, B, C, and E. Samples A, B, and C were first treated by placing the samples into an aqueous solution of 50 volume percent methanol overnight, then dried in air in a fume hood at room temperature overnight. The samples were then treated with fluorine in nitrogen and, after fluorine treatment, exposed to air with a relative humidity of about 70 to 80% at room temperature. Sample E (prepared exactly as the membrane in Example 2) was not treated with aqueous methanol, but was dried in air overnight before fluorine treatment and was exposed to air with a relative humidity of about 70 to 80% at room temperature after fluorine treatment. A comparative sample, D, was treated with aqueous methanol and dried in air overnight before fluorine treatment, but rather than being exposed to air after fluorination treatment, was placed in an dry argon atmosphere. The standard membrane was neither methanol treated nor fluorine treated.

TABLE I

| Sample | Samples Treated | | | |
|---|---|---|---|---|
| | Aq. MeOH Treated | $F_2$ in $N_2$ (Vol %) | Exposure Time (min) | Exposed to Air |
| Standard | No | 0 | 0 | — |
| A | Yes | 0.025 | 5 | Yes |
| B | Yes | 0.025 | 30 | Yes |
| C | Yes | 0.025 | 60 | Yes |
| D | Yes | 0.025 | 30 | No (argon) |
| E | No | 0.050 | 30 | Yes |

EXAMPLE 4—CHARACTERIZATION OF FLUORINE-TREATED MEMBRANES

Four of the membranes of Example 3 were characterized by electron spectroscopy for chemical analysis (ESCA) to determine the degree of surface fluorination. The results in Table II show the atomic percentages of sulfur, carbon, oxygen, and fluorine at the surface (up to a depth up to 50 Å) for the fluorine-treated and untreated membranes. The carbon content is considered to be constant since fluorine treatment at low fluorine concentrations should not degrade the membrane surface (i.e., there is minimal release of volatile reaction products). The atomic percentages may therefore be normalized with respect to the measured atomic carbon concentration. The ratios of O/C and F/C are then indicators of the relative oxygen and fluorine content.

The need for exposing the fluorine-treated membrane to air is demonstrated by comparing the O/C and F/C ratios for the standard, for the inventive membrane C, and for the comparative membrane D. Unlike membrane C, membrane D was not exposed to air after the fluorine treatment and was characterized by ESCA without any contact with air. Membrane D became very brittle. The amount of oxygen on the surface of membrane D is less than on the surface of membrane C and is comparable to that of the non-fluorine-treated standard membrane. The oxygen on the surface of inventive membrane C is likely the result of reaction of the treated membrane with either oxygen or water present in the air.

Comparing the O/C and F/C ratios for the standard membrane and for the inventive membranes C and E shows that the fluorine treatment adds both fluorine and oxygen to the membrane surface regardless of whether it treated with aqueous methanol before fluorine treatment.

TABLE II

| Membrane | ESCA Results | | | |
|---|---|---|---|---|
| | Standard | C | D | E |
| S | 2.5 | 1.0 | 0.9 | 1.1 |
| C | 82.4 | 50.4 | 48.5 | 52.3 |
| O | 15.1 | 12.0 | 9.2 | 13.1 |
| F | 0 | 36.5 | 41.4 | 33.5 |
| S/C | 0.030 | 0.020 | 0.019 | 0.021 |
| O/C | 0.184 | 0.239 | 0.19 | 0.251 |
| F/C | 0 | 0.724 | 0.854 | 0.640 |

EXAMPLE 5—EFFECT OF INCREASED FLUORINE TREATMENT TIME

The effect of varying the fluorine treatment time on the contact angle of the standard membrane and of inventive membrane Samples A, B, and C of Example 3 was measured by observing a water droplet freshly deposited on the membrane surfaces. Treatment times ranged from 0 to 60 minutes. The results appear in Table III.

TABLE III

| Sample | Contact Angles | |
|---|---|---|
| | Treatment Time (Min) | Contact Angle (Water) |
| Standard | 0 | 90.0 |
| A | 5 | 75.8 |
| B | 30 | 69.4 |
| C | 60 | 56.3 |

Table III shows that the contact angle decreased with increased severity of the fluorine treatment. The decrease in contact angle is indicative of an increase in the hydrophilicity of the membrane surface. In another experiment done with a dried membrane which was not treated with aqueous methanol before fluorine treatment and in which the fluorine treatment was carried out with a fluorine concentration of 2 volume percent and an exposure time of 15 minutes, complete wetting (i.e., a contact angle approaching zero) was observed. Because the surface tends to deteriorate due to fluorine attack at higher fluorine concentrations, lower concentrations or shorter fluorine exposure times are preferred.

EXAMPLE 6—EFFECT OF FLUORINE TREATMENT ON PORE SIZE

The ability of fluorine-treated and untreated membranes to separate dextran (a mixture of polymers of glucose of varying molecular weights) from water was tested to determine whether the fluorine treatment altered the size of the pores in the membranes. Dextran feeds of two different molecular weight distributions were used. Membrane samples B and C of Example 3 were tested dry. The standard, prepared as in Example 3, was water wetted and was not dried in air before testing. The membranes were placed in the closed loop system of Example 1 at approximately 25° C. with a pressure differential of 689.5 kPa. Results appear in FIGS. 1 and 2.

FIG. 1 shows separation results using a dextran feed with a low molecular weight distribution having a single peak at $5.5 \times 10^4$ daltons. All molecules in the low molecular weight distribution dextran feed permeated through both treated and untreated membranes (i.e., there was no rejection of dextran). If the pore size of the membrane had decreased due to the fluorine treatment, the treated membrane would have exhibited a higher rejection than the untreated membrane. The fact that the treated membranes exhibited the same distribution as the untreated membranes indicates that the membrane pore size did not decrease after fluorine treatment.

Figure 2:
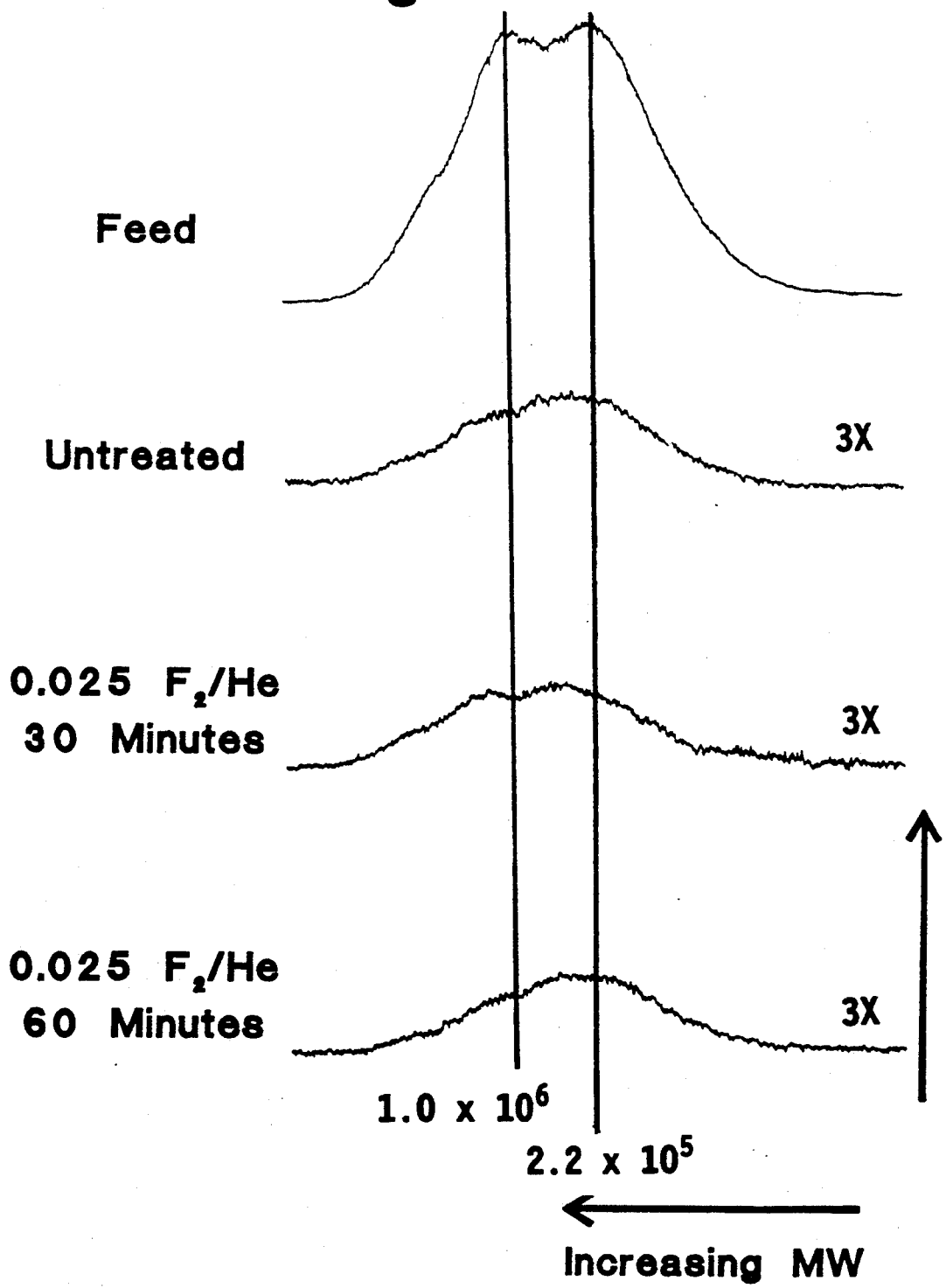
FIG. 2 shows the effect of fluorine treatment on the ability of a membrane to separate a high molecular weight distribution of dextran from an aqueous solution.

A second dextran feed with a higher molecular weight distribution, shown in FIG. 2, had a plateau which extended from $2.2 \times 10^5$ to $1 \times 10^6$ daltons. FIG. 2 shows that there was very little permeation of this dextran feed through either fluorine-treated or untreated membranes. An increase in the pore size would have caused a lower rejection of dextran (higher dextran permeation). This experiment indicates that the pore size of the treated membrane was not increased due to the fluorine treatment (e.g., by degradation of the membrane). The two dextran experiments taken together indicate that the pore size of the treated membranes has not measurably changed as a result of the fluorine treatment.

EXAMPLE 7—EFFECT OF FLUORINE TREATMENT ON FLUX

A water-wetted standard membrane and membranes prepared as samples B and C of Example 3 were tested to determine the effect of the fluorine treatment on the flux of deionized water and the flux of permeate from a potato waste stream through the membrane. The standard membrane was tested wet while Samples B and C were tested dry. The membranes were tested in the closed feed loop of Example 1.

Figure 3:
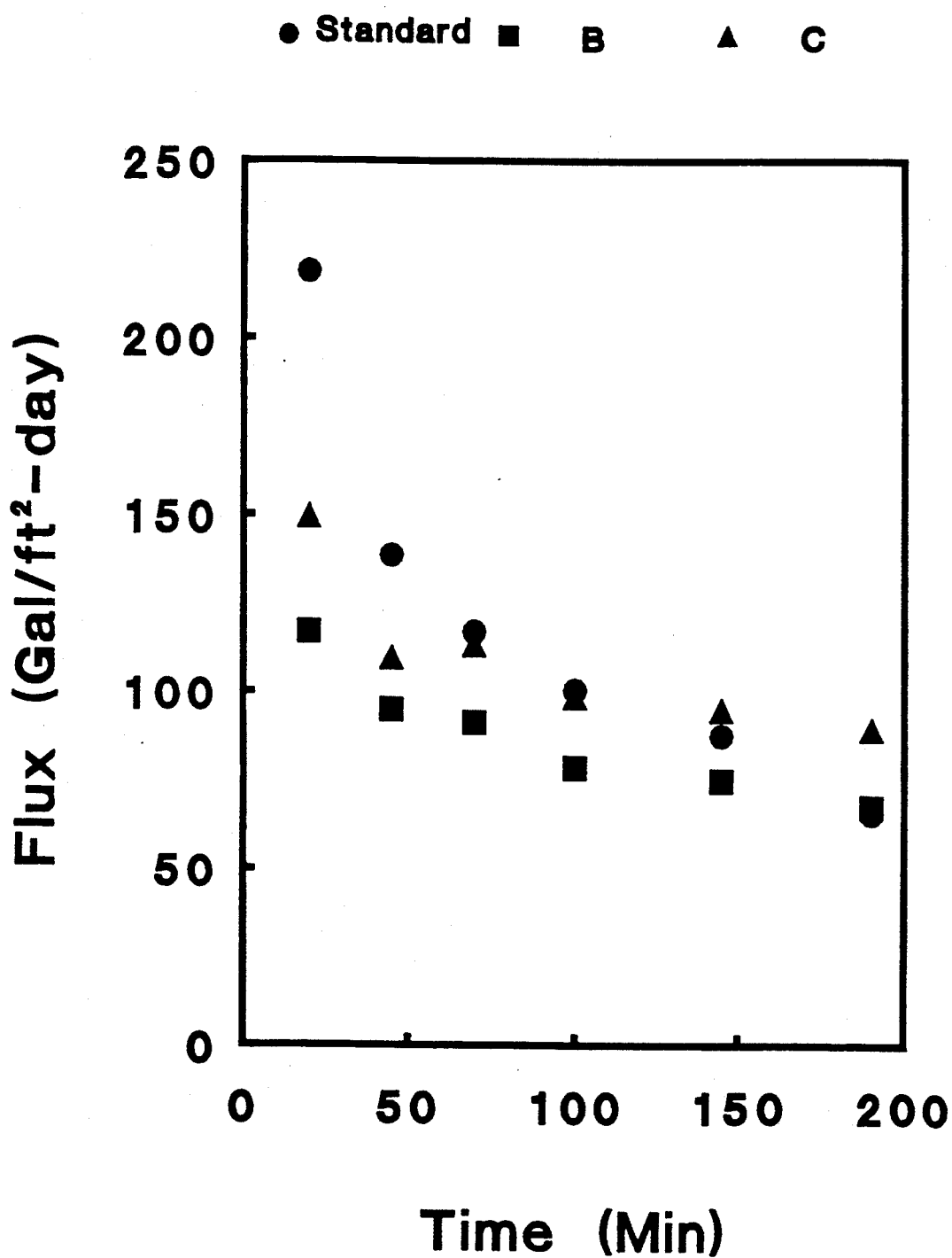
FIG. 3 shows the effect of fluorine treatment on the water flux of a membrane.

FIG. 3 shows the flux of deionized water through the membranes. As expected, the wetted standard membrane exhibits the highest initial flux because the pores are saturated with water, eliminating the need to overcome capillary pressures. With time, the flux advantage of the standard decreases and the inventive membranes begin to exhibit higher fluxes than the standard membrane. In addition, a comparison of samples B and C (fluorine-treated for 30 and 60 minutes, respectively) shows that the inventive membrane with the longer fluorine treatment time is better able to maintain long-term deionized water flux.

Figure 4:
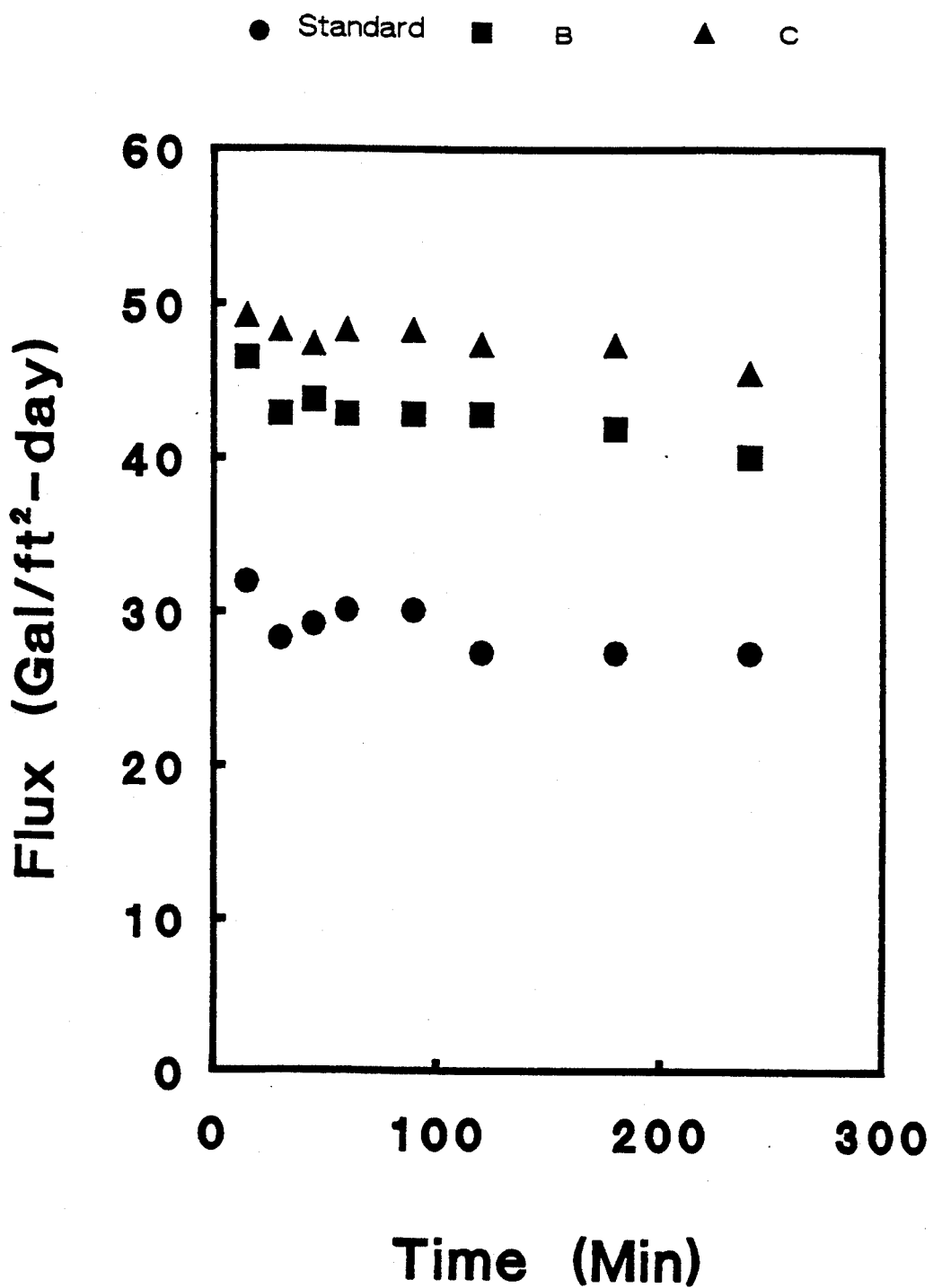
FIG. 4 shows the effect of fluorine treatment on the potato waste flux of a membrane.

FIG. 4 shows the effect on the flux when the feed is switched to a potato waste feed, a process waste stream obtained from a potato processor which contained total solids of 1.1 weight percent. The flux of the potato waste permeate is clearly greater through the fluorine-treated membranes than through the standard membrane. The flux through the membranes increases with increased treatment time (i.e., sample C with a fluorine treatment time of 60 minutes had a greater flux than sample B with a fluorine treatment time of 30 minutes).

Figure 5:
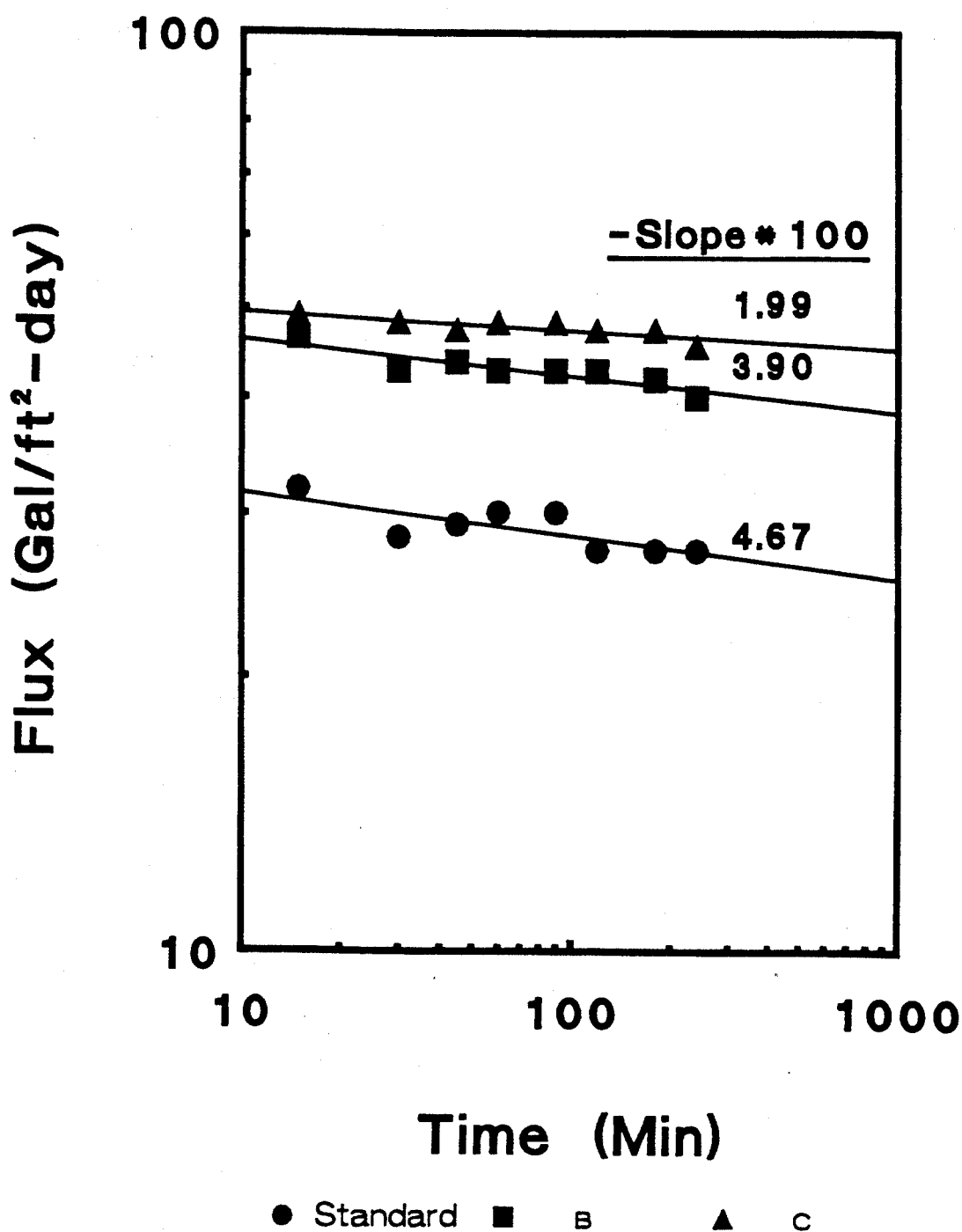
FIG. 5 illustrates the decrease of the fouling rate with treatment time for two fluorine-treated polysulfone membranes and for a standard untreated membrane.

The fouling rate of these membranes was determined by calculating the slope of each curve on a log flux versus log time plot. An ideal non-fouling membrane would have a slope of 0. FIG. 5 illustrates that the rate at which the membranes fouled decreased with increased treatment time and that the inventive membranes (Samples B and C) were more resistant to fouling than was the standard.

We claim:

1. A membrane for removing organic products or impurities from an aqueous waste stream and having improved flux and improved fouling resistance, said membrane being prepared by treating a porous polysulfone membrane having a pore size ranging from 0.001 to 10 $\mu$m by the steps comprising:
   (a) optionally treating said membrane with an aqueous methanol solution;
   (b) drying said membrane;
   (c) treating said dried membrane with a mixture of fluorine and an inert gas in an amount and for a period of time sufficient to increase the liquid flux and fouling resistance over that of a non-treated membrane and in the substantial absence of oxygen without significantly altering the pore size of said membrane; and,
   (d) exposing said treated membrane to air, 2. The membrane of claim 1 wherein said porous polysulfone membrane is treated at a temperature in the range of from about $-45°$ to $70°$ C. and at a pressure of about atmospheric or above atmospheric.

3. The membrane of claim 1 wherein said mixture comprises fluorine from about 0.0125 to about 10 volume percent.

4. The membrane of claim 1 wherein said mixture comprises fluorine from about 0.025 to about 2 volume percent.

5. The membrane of claim 1 wherein said porous polysulfone membrane is selected from the group consisting of polyphenyl sulfones, polyether sulfones, and polyaryl ether sulfones.

6. The membrane of claim 1 wherein said porous polysulfone membrane is an asymmetric membrane from the condensation polymer of bisphenol A and dichlorodiphenyl sulfone on a support.

7. The membrane of claim 1 wherein said inert gas is selected from the group consisting of helium, nitrogen, and argon.

8. The membrane of claim 1 wherein said treatment is carried out in the presence of ultraviolet radiation.

9. A process for removing organic products or impurities from an aqueous waste stream comprising filtering a waste stream through the membrane of claim 1.

* * * * *